United States Patent
Segal et al.

[15] 3,656,243
[45] Apr. 18, 1972

[54] RESPONSE SYSTEM WITH IMPROVED COMPUTATIONAL METHODS AND APPARATUS

[72] Inventors: Bernard M. Segal, Binghamton, N.Y.; David Friedman, Framingham, Mass.

[73] Assignee: The Singer Company, New York, N.Y.

[22] Filed: Aug. 10, 1970

[21] Appl. No.: 62,382

[52] U.S. Cl. .................................................. 35/48 B
[51] Int. Cl. ............................................................ G09b
[58] Field of Search ......................................... 35/48, 9

[56] References Cited

UNITED STATES PATENTS

| | | | |
|---|---|---|---|
| 3,141,243 | 7/1964 | Chapman et al. | 35/9 A |
| 3,300,875 | 1/1967 | Nisbet | 35/9 A |
| 3,077,038 | 2/1963 | Williams et al. | 35/9 B |
| 3,500,559 | 3/1970 | Jones et al. | 35/48 |
| 3,579,861 | 5/1971 | Hallett | 35/48 |

Primary Examiner—Robert W. Michell
Assistant Examiner—J. H. Wolff
Attorney—Francis L. Masselle, William Grobman and Charles S. McGuire

[57] ABSTRACT

An improved classroom response system of the type wherein a number of students are provided with individual responders each having a plurality of switches selectively operable to indicate the student's choice of response to a question or other stimulus. The invention is directed to novel methods and apparatus for performing arithmetic operations and displays which make available to the instructor information helpful in conducting the class and otherwise simplify instructional tasks. Included are means for automatically indicating which of several responses is "correct" by determining the response to which the highest weight has been assigned by the instructor. Also disclosed are novel means to calculate each individual student's cumulative score and to indicate automatically the students whose scores fall below a preselected acceptable percentage of the maximum possible score. Displays of the total number of students responding to a given question, and the percent of the class which has responded with any of the possible choices are provided.

4 Claims, 13 Drawing Figures

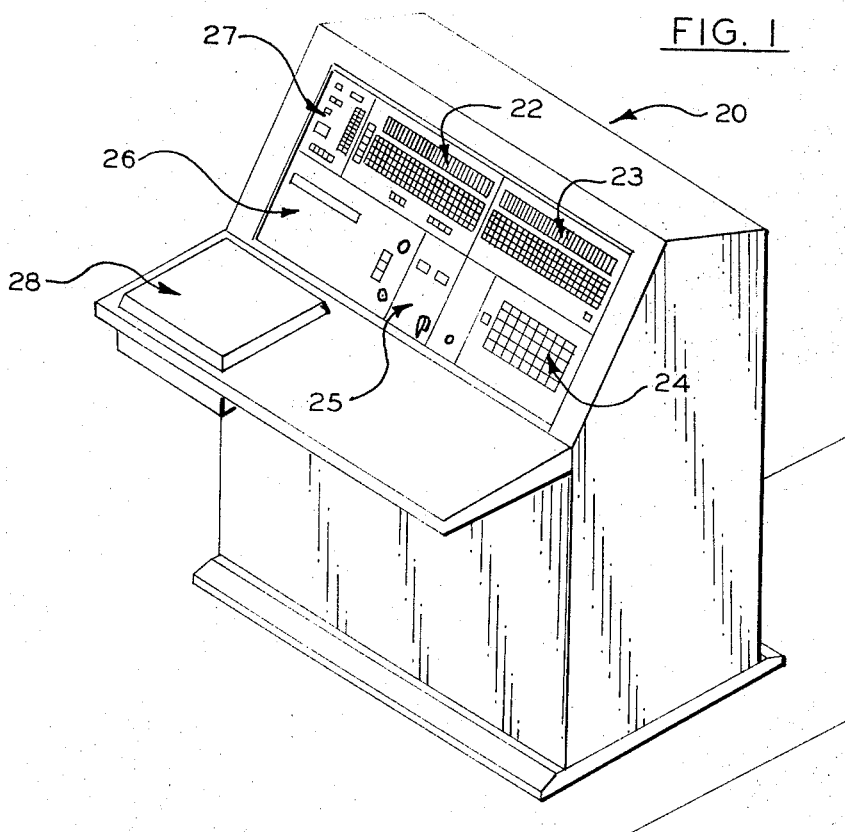
FIG. 1
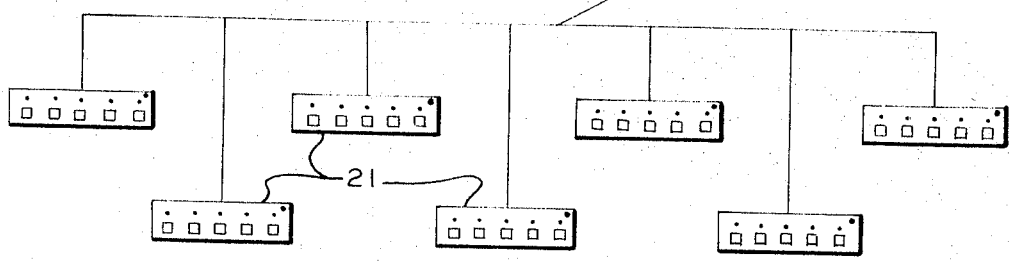
FIG. 4
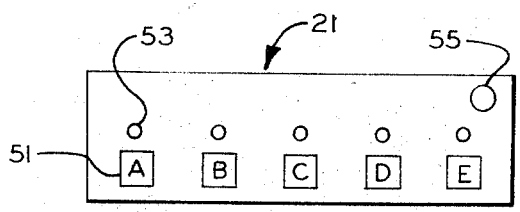

FIG. 3

RESPONSE SYSTEM WITH IMPROVED COMPUTATIONAL METHODS AND APPARATUS

This invention relates to electrically operated teaching and testing apparatus and more particularly to a group of automatic features in such apparatus which allow the instructor to operate more efficiently.

The expansion in education and shortage of teachers has brought about a great need for devices which will enable an instructor to effectively teach greater numbers of students. One of the most effective types of such devices provides individual responders for each student, which responders are all connected to an instructor's console. Generally, each responder will have four or five separate response buttons which the student may press to indicate his selection of a proper response from a group of possible responses. Responders may be used to indicate comprehension of lecture material, in which case each button will signify a level of understanding (for example, one button might signify "slow down"), or as a means of answering multiple choice questions during testing. In either case the responses are generally displayed to the instructor in some manner and may be permanently recorded for further analysis. In this way the instructor can monitor the performance of his class while lecturing or testing and make necessary adjustments as he goes along. He will also have permanent records useful in grading students and in finding which students require additional help.

Response data may also be used in automatic detectors which give the instructor an indication when correct responses of an individual student or of the class as a whole drop below a set minimum number or percentage of correct responses. In some cases responses are given weights and each response must be scored accordingly. Another important feature in such a system, where it is being used for teaching and testing through multiple choice answers, is correct answer reinforcement which lets a student know if he has selected the proper response and, if not, which response is the proper one. In some applications it is important that this correct answer reinforcement be simultaneous with the student's response. Such a response system is described herein and is the object of U.S. application Ser. No. 62,280, filed on even date herewith and assigned to the same assignee as the present invention.

The present invention supplies to the instructor the types of information described above, using novel circuitry and computational techniques. The number of students in the class who have responded and the percent responding to a preselected choice are displayed. Weights may be assigned to each answer, and assigned weights are displayed for easy verification and may be changed with ease. Automatic selection of the highest assigned weight is also provided by novel means having general application. In addition, the instructor may select a minimum percentage score which he feels is acceptable and have displayed an indication of any students whose score falls below the minimum. The system also provides novel means of scoring questions and storing cumulative scores for each student which are then available for a hard copy print out.

The object of this invention is to provide improved teaching and testing apparatus.

Another object is to provide a method and apparatus to determine which of several numbers is greater, with special reference to the automatic indication of the highest weighted choice from a number of such choices to which various numerical weights have been assigned.

An additional object is to provide a method and apparatus for computing a selected percentage of a given number.

It is also an object to compute the number of students in a group who have responded via electrical responder means to a question and the percent of those responding who have responded with the preselected answer.

Another object is to provide electrical teaching and testing apparatus which will display to the instructor an indication of those students who have scores falling below a preselected percentage of a maximum possible score.

Still another object is to provide a simplified method and apparatus for use in electrical student response apparatus to score student answers and store cumulative student scores.

Other objects of the invention will in part be obvious and will in part appear hereinafter.

The invention accordingly comprises the several steps and the relation of one or more steps with respect to each of the others, and the apparatus embodying features of construction, combination of elements, and arrangement of parts which are adapted to effect such steps, all as exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a pictorial view of the system comprising an instructor's console and student responders;

FIGS. 2 and 3 illustrate an embodiment of two portions of the face or display portion of the instructor's console of FIG. 1;

FIG. 4 illustrates one exemplary form which the face of the student responder may take;

FIG. 10 illustrates an embodiment of the scoring panel of the instructors console of FIG. 1;

FIG. 1 shows a teaching and testing system, which includes instructor's console 20 and remote student responders 21, where the present invention may be used. Panels 22 and 23, shown in more detail in FIGS. 2 and 3 contain indicators through which the instructor may monitor student responses and controls for the instructor to operate the response system. Panel 24 is a control panel for operating ancillary equipment such as motion picture and slide projectors which may be used in teaching and testing presentation. Panel 25 is a response summary panel which indicates the number of students responding and the percent selecting a certain response. Controls for programming a tape recorder 28 are contained on panel 26. Any of the functions, such as control of the ancillary equipment and control of the response system, which can be performed manually from the panels may also be programmed on tape to provide a pre-programmed lesson or test. Panel 27 contains the controls for assigning weights to each response and for selecting a minimum percentage score to be compared with individual student percentage scores when the instructor desires to do so, at which time an indication will be given to the instructor of each student falling below the selected minimum by lighting one of the instructor's indicators associated with the student.

Figure 2:
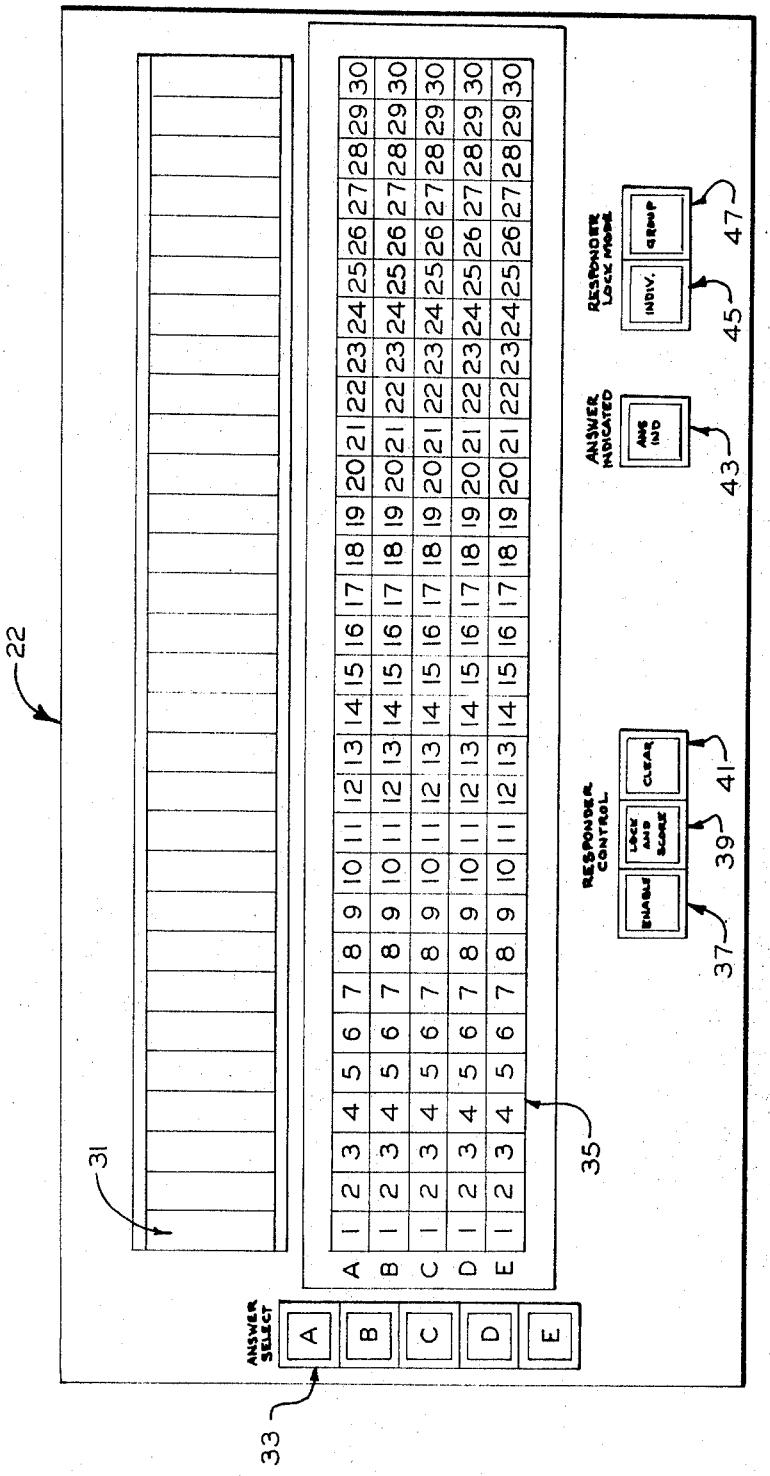
Figure 3:
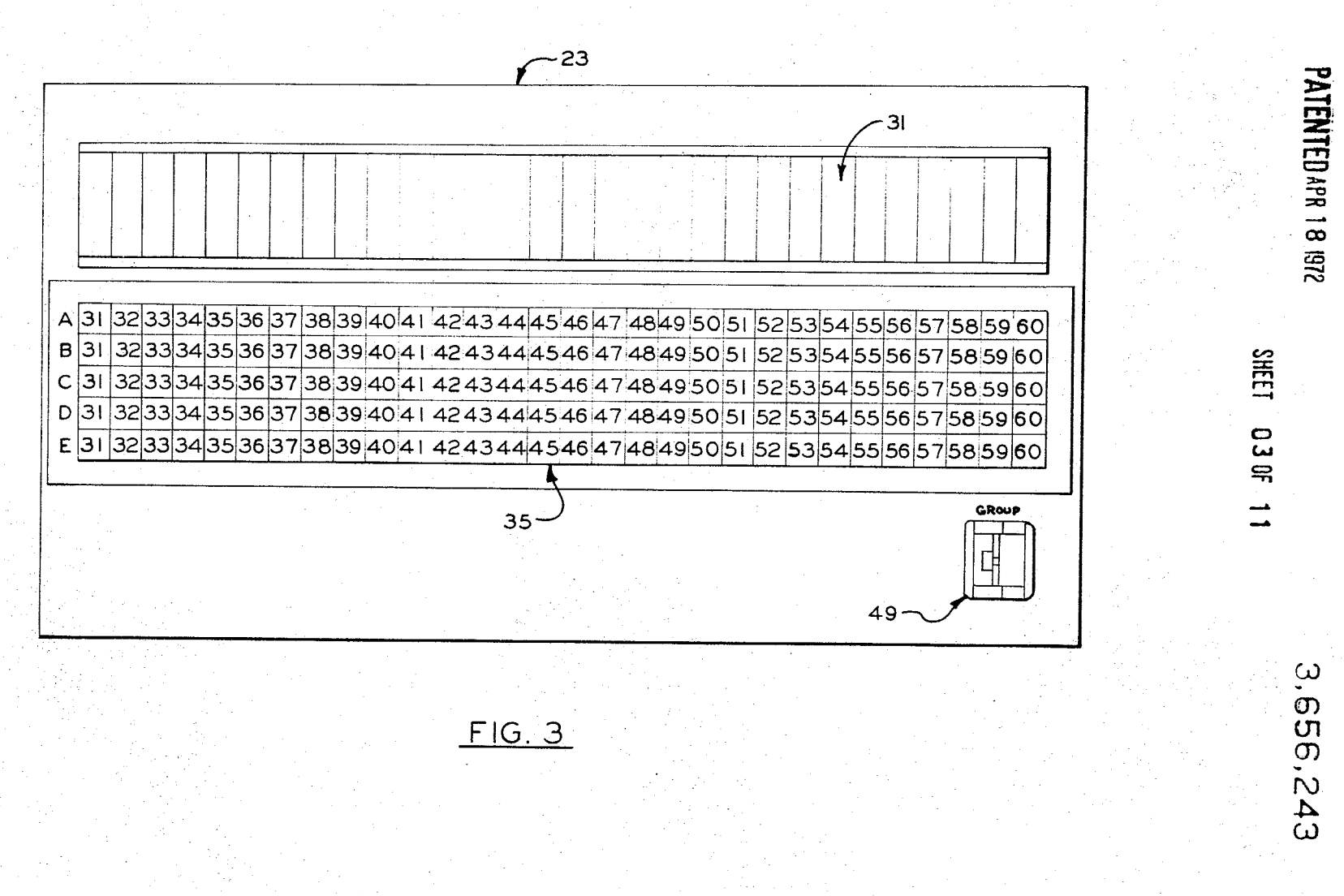

A better understanding of the use of the response system may be had by referring to FIGS. 2, 3, and 4. FIG. 2 shows the instructor's individual student response indicators 35 which indicate to the instructor which response has been selected by each of the students in the group. Thirty columns of lights are arranged in rows representing the possible responses with each student's number on all of the lights corresponding to his responses. Above each column of indicators is a position 31 for placing a student's name. Also on this panel are the controls associated with correct answers and answer reinforcement. By use of answer selector switches 33 the instructor may select one of the possible responses as the correct answer. Answer indicator switch 43 is an alternate action switch which allows the instructor to display or not display the correct answer to the students, as desired. The responder lockmode controls 45 & 47 determine whether the students may change answers or not during the time allowed for response and, if the correct answer is to be indicated to the students, as determined by switch 43, the lockmode controls determine when this will occur. One or the other of the two switches, individual mode 45 or group mode 47 will be selected. In individual mode the student has only one chance to answer the question and, if answers are to be indicated, the correct answer will be displayed to him simultaneously with his selection. In the group mode the student may change answers until the lock and score switch 39 is pressed and, if answers are being indicated, the display of correct answers will not occur until this lock and score switch is pressed. The clear switch 41 clears any previous responses stored within the system. Enable switch 37 is used to enable the student responders when the instructor desires to obtain responses from the students.

The panel in FIG. 3 is basically an extension of the panel in FIG. 2 containing indicators for an additional 30 students. The one additional function presented is a group selection switch 49 which allows the system to be used with more than 60 responders at a time. When more than 60 responders are used they are divided into groups of 60 and each group is assigned a number. For example, group 1 would be responders 1–60, group 2, 61–120, etc. By selecting the desired number on switch 49 (shown in the form of a thumbwheel or digiswitch) the instructor may select one of these groups to be displayed.

FIG. 4 shows a responder 21 containing switches 51 used by the student to indicate his response, indicator lamps 53 on which his last selected response and, under the proper conditions, the correct answer are indicated, and ready indicator 55 will flash for a few seconds after the instructor has enabled the responders.

As previously indicated, the response system may be operated in either of two modes under selective control of the instructor by pressing either individual mode switch 45, or group mode switch 47. In group mode the instructor will first press the enable switch 37. At this time light 55 on the responder will flash for a few seconds indicating to the student that the responder is activated. The student is then presented with a situation requiring a response, which he selects by pressing one of the switches 51. The indicator 53 above the switch pressed will then light, as will the corresponding indicator 35 on the instructor's panel 22 or 23. For example, if student 25 selects C then indicator 35 on panel 22 in row C numbered 25 will come on as will the indicator 53 above switch C on the responder of student 25. The student may change his selection if desired, with corresponding changes in both his indicators 53 and the instructor's indicators 35, until the instructor presses the lock and score switch 39. At that time the last response selected by each student is retained in the system, as will be described below and, if the instructor has preselected a correct answer by pressing one of switches 33 and has pressed the answer indicator switch 43, the preselected indicator 53 corresponding to the correct answer will flash on the responder of each student who has not answered correctly and the same flashing will be repeated on the instructor's indicators 35. If no correct answer has been selected, or if the answer indicator switch 43 is not on, then the student will have no correct answer reinforcement. In individual mode, the instructor generally selects a correct answer by pressing one of switches 33 prior to pressing enable 37. In this mode the student gets only one chance at responding. As soon as one of switches 51 is pressed, the responder is disabled and his selection appears simultaneously with a flashing correct answer, if his is not the correct one, on his indicators 53. Again, if the instructor does not desire the student to have correct answer reinforcement, as might be the case in a test, he will keep switch 43 off.

Figure 5:
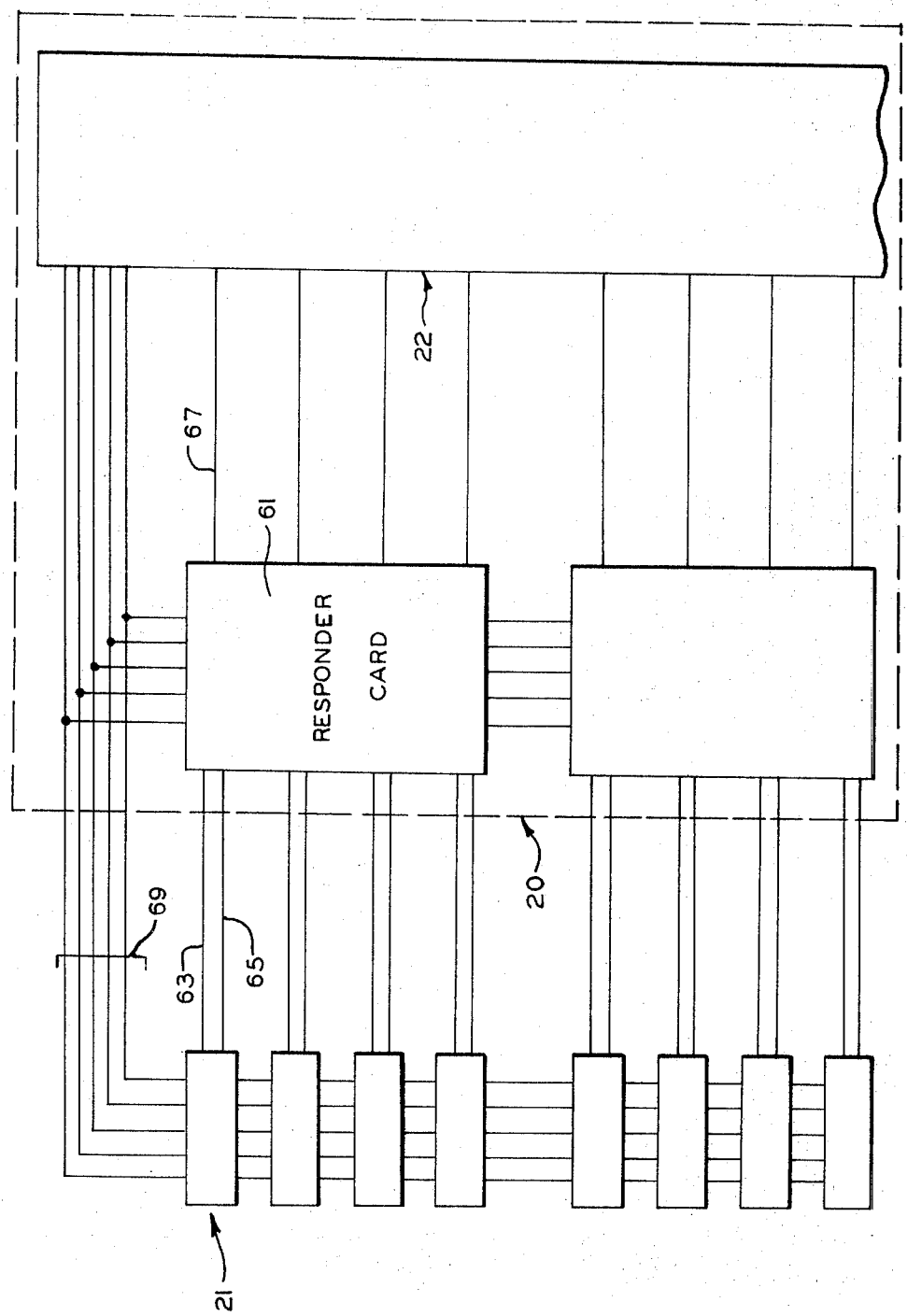
FIG. 5 is a block diagram useful in understanding the interconnections in the system.

The novel manner in which this is accomplished may be seen by reference to the remaining figures. FIG. 5 shows in block diagram form the connection between the responders 21 and instructor's response display 22 through responder cards 61 which contain the logic for the responders and which will be described in more detail below. As is shown, only two individual wires, an input wire 63 and an output wire 65, are required between responder card 61 (located in console 20) and the individual responders. Additional wires 69 of a number equal to the possible number of responses are bussed to groups of responders, to the responder cards 61 and to the instructor's indicator panel 22 as shown. Likewise, only one wire 67 per responder is required to transmit data from cards 61 to the instructor's response display 22 and other parts of the system.

Figure 6:
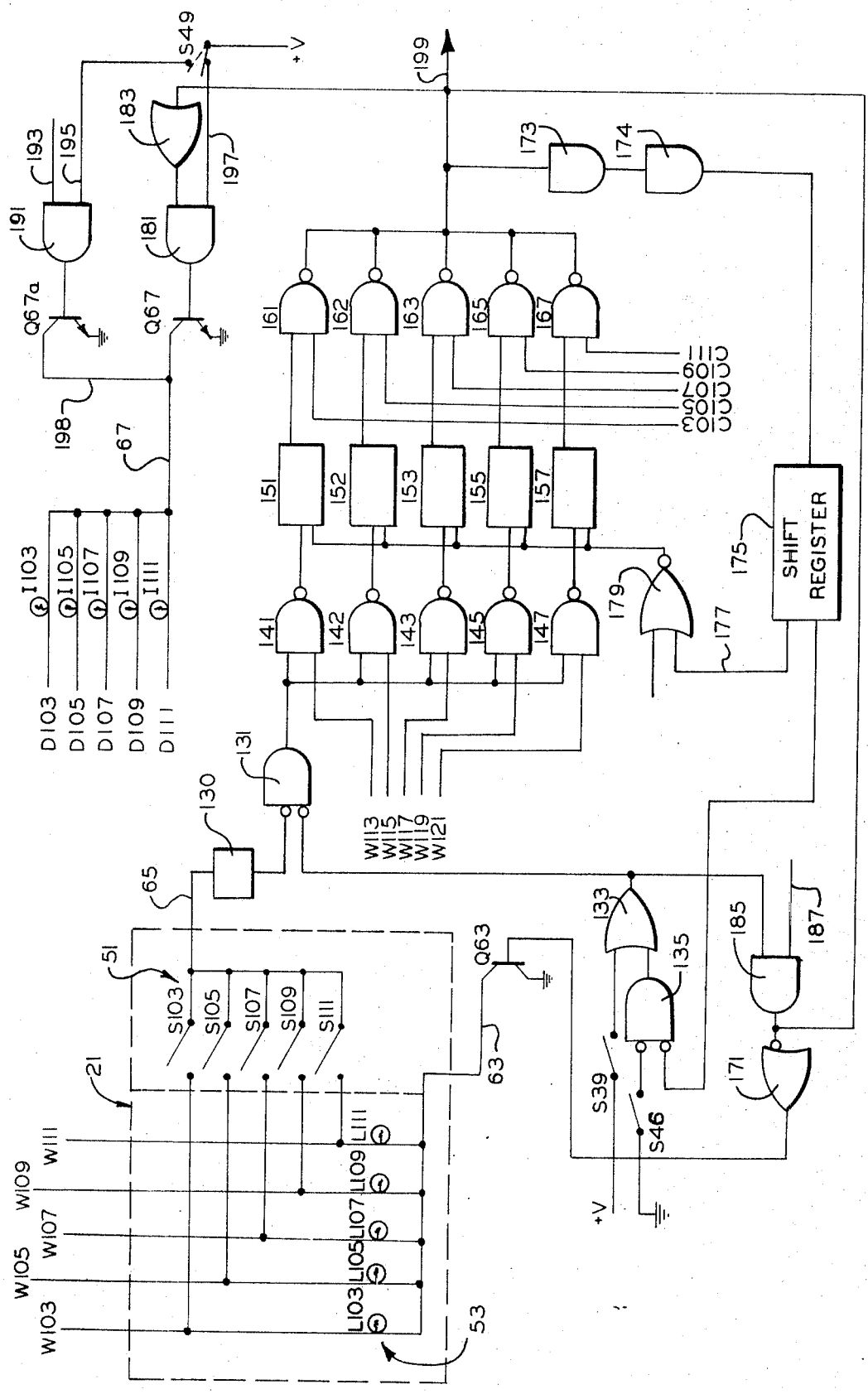
FIG. 6 is a logic diagram illustrating an embodiment of the response system in detail.
Figure 7:
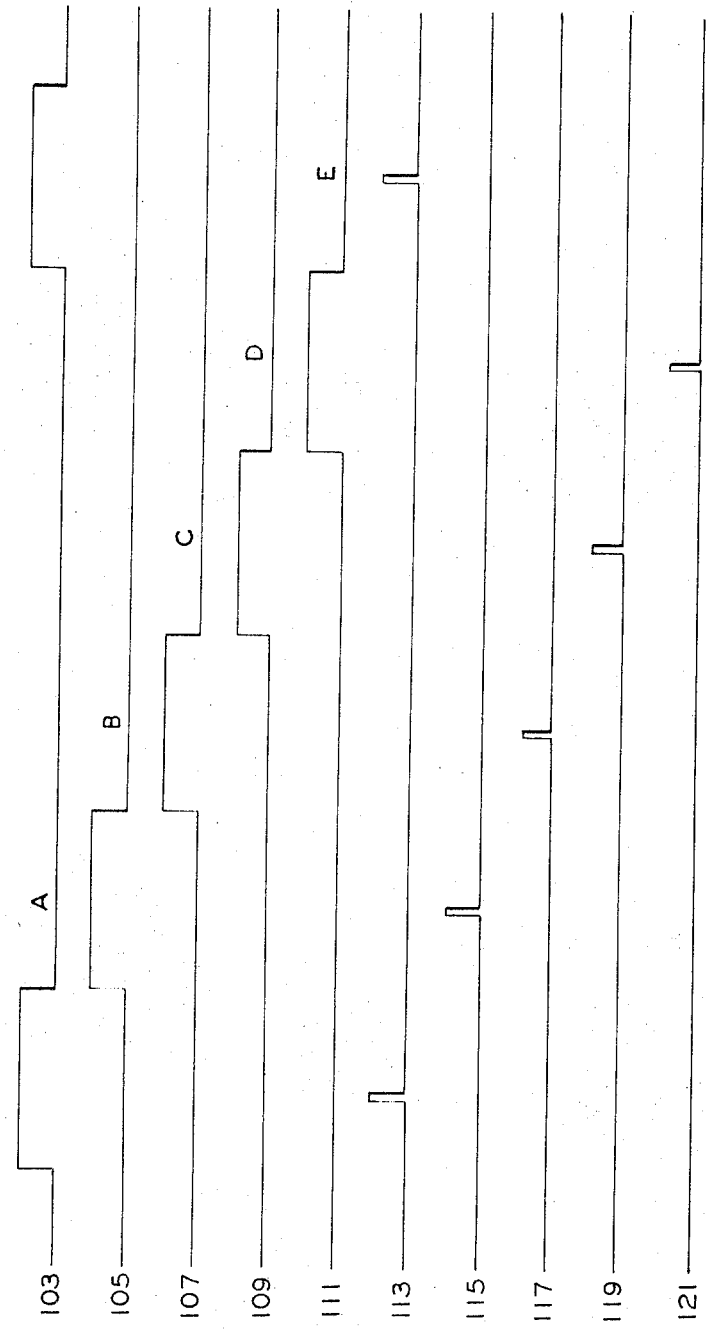
FIG. 7 is a timing diagram helpful, in connection with FIG. 6, to an understanding of the illustrated embodiment of the invention.

FIG. 6 shows a simplified logic diagram of one student's response circuit, and FIG. 7 shows the timing associated with it. By examining these together it will be possible to see how the desired results are obtained using so few wires, by means of multiplexing or time sharing.

The pulses shown on FIG. 7 are generated by a pulse generator having a frequency of, for example, 500 $KH_z$, and associated counters (not shown). The basic clock frequency of 500 $KH_z$ from the pulse generator is counted down and after a predetermined time increment, e.g., every 128 counts (256 microseconds), one of the pulses 103, 105, 107, 109 or 111 will go off and the next one come on. Each pulse will remain on for 128 counts, at which time it will go off and the next pulse will come on. The pulses 113, 115, 117, 119, and 121 consist of one clock pulse in the middle of "on" time of an associated one of pulses 103, 105, 107, 109 and 111.

The operation of the logic in FIG. 6 may best be explained by some examples of how it operates in the different modes. During the time when students may respond in group mode, S39, associated with lock and score switch 39 on FIG. 2, will be open and, with group mode selected by pressing switch 47 on FIG. 2, S46 will be open. (The open position of S46 corresponds to switch 47 being pressed and the closed position to switch 45 being pressed.) Gate 135 is an AND gate with inverted inputs. Only with both inputs at ground will it have a high output. (For the purposes of this discussion of the words "ground" and "high" will be used to represent the two logical states possible in the operation of the logic circuits involved. Grounds may be thought of as an "OFF" or "0" condition and high as an "ON" or "1" condition.) Since one of the inputs to gate 135 is from switch S46, the gate cannot have a high output until that switch is closed to ground. The output of switch S39 is an input to OR-gate 133. This type of gate will have a high output when either of its inputs are high. Since switch S39 is open and the output of gate 135 is a ground, neither input to 133 is high and its output will be a ground. This output is one of the inputs to gate 131. The other input to gate 131 comes from noise immunity circuit 130, which is basically a transistor inverter. Gate 131 is also an AND gate with inverted inputs. Only if both inputs are at ground will the output be high. In the present example, as just explained, the input from gate 133 is a ground; thus, the output of gate 131 will be high whenever the input thereto from noise immunity circuit 130 is a ground. With all of the student response switches 51 in the open position as shown, there will be an open input to the noise immunity circuit 130, and the output will be high. When a student presses one of his switches 51, for example, S103, then during the times when the voltage on W103 (corresponding to 103 on the timing diagram of FIG. 7) is high, the output of noise immunity circuit 130 will become a ground and the output of gate 131 will be high. This output is one input to gates 141, 142, 143, 145 and 147, all of which are NAND gates. The operation of these gates is such that when both of the inputs are high their output will be a ground. Therefore, if a high appears on the second input of any of gates 141, 142, 143, 145 or 147 during the time that the output of gate 131 is high a ground will appear on the output of that gate. The other inputs of these gates are the wires W113, W115, W117, W119, and W121 which carry signals from the pulse generator corresponding to 113, 115, 117, 119, and 121 on the timing diagram, FIG. 7. Therefore, with S103 closed, a high will be on the first input of gate 141 at the time when a high appears on W113 and the output of gate 141 will go to ground during the time W113 is high. Since by the time the second inputs of gates 142, 143, 145, and 147 have highs on them from W115, W117, W119, and W121, the high from gate 131 on their first input (corresponding to 103 on FIG. 7) will have gone back to ground, the outputs of these gates will remain high.

The outputs of gates 141, 142, 143, 145, and 147 provide the inputs to set corresponding latches 151, 152, 153, 155 and 157. The second input to the latches is from OR-gate 179 and is a reset signal. The latches 151, 152, 153, 155 and 157 consist of two gates. When the input to latch 151 from gate 141 goes to ground the output of the first of the two gates, an OR gate with inverted inputs, will go high. This is one of the two inputs to the second gate, a NAND gate, the other input being the reset line from gate 179. At times other than reset, the output of gate 179 will be high and when the other input from the first gate of the latch, to this second gate of the latch goes high a ground will result on its output. This ground is then fed back as a second input to the first gate. Thus, when the signal from gate 141 goes back to ground the output of the first gate of the latch will remain high because of the ground from the second gate, thus causing a latching action. When it is desired to reset the latch, the high on gate 179 is removed and the output of the second gate in the latch goes high causing the output of the first gate to go to ground. Because of the high pulse frequency it is virtually impossible for the student to remove his finger from the switch before the above described chain of events occurs.

The output of latches 151, 152, 153, 155, and 157 are taken from the output of the first gate in the latch and provide inputs, respectively, to NAND-gates 161, 162, 163, 165, and 167. The second inputs to these gates are provided, respectively, on C103, C105, C107, C109 and C111 which carry signals from the pulse generator corresponding to the same numbers on FIG. 7. In the present example, S103 is closed and latch 151 latched with a high output. Now each time a high appears on C103, both inputs of gate 161 will be high and a ground will result on its output. This output goes to gate 171, an OR gate with an inverted input. This gate will have a high output when its input is at ground. Hence, when the output of gate 161 goes to ground the output of gate 171 will go high and allow transistor Q63 to turn on. Keeping in mind that this only occurs during the time C103 is high, i.e., Q63 will be on only during the time 103 on the timing diagram is high, it can be seen that, when W103 goes high at this same time, L103 will light since it has a return path through Q63. Because of the repetition rate of the pulses, L103 will appear to stay on constantly.

Should the student change his answer, for example by closing S105, then latch 152 will latch in the same way 151 did when S103 was closed, and Q63 will now be on during the time of pulse 105. With no other action, both L103 and L105 would light. However, the output from the gates 161, 162, 163, 165, and 167 is also an input to shift register 175 after being gated through gates 173, and 174. (These last two gates have additional inputs, not shown, to perform functions not pertinent to this invention.) Shift register 175 consists basically of two flip flops. The input from gate 174 goes to both of these flip flops. The first flip flop will be set by any pulse but the second may only be set when a previous pulse has set the first flip flop. Each time the system cycles through the set of signals 103, 105, 107, 109, and 111 both flip flops are reset. Therefore, is only one answer has been selected, during each cycle only the first flip flop will be set. But in the present example, where an output is present during the time of 103 and another during 105, two pulses will occur during the cycle causing the second flip flop to set on the second pulse.

This output will appear as a high on line 177 an input to gate 179. This high on the input of gate 179 will cause its output to go to ground and all the latches will be reset as explained above. Because of the speed with which this occurs the students will not be able to remove his finger from the button for S105 before latch 152 is latched on the next cycle. Now with only one latch (152) set only the first flip flop in shift register 175 will be set on each cycle and latch 152 will not be reset, the return path through Q63 will occur during the time a voltage is on W105 and L105 will be lit. Although both lights L103 and L105 are on for one cycle it will appear to the student that, when he changed his selection by pressing S105, the first light went out and simultaneously the second came on.

The student's indication on lights L103, L105, L107, L109 and L111 is also shown on the instructor panel lights I103, I105, I107, I109 and I111 by means of gates 181 and 183 which control transistor Q67, thereby bringing line 67 to ground at the proper time, with the signals on D103 through D111 corresponding to 103-111 on the timing diagram providing the voltage similarly to W103-W111.

When the period for answering is over the instructor presses the button closing lock and score switch S39, thereby placing a high on one input of gate 133, causing the output to go high, thus removing the ground from one input of gate 131. Gate 131 will then be disabled and the last selected response will remain latched.

If the instructor has selected a correct answer by pressing one of the switches 33 on FIG. 2 a signal corresponding to this selection will appear on line 187. This correct answer signal is generated in a portion of the system not shown by selecting one of the signals 103, 105, 107, 109, or 111 corresponding to the answer selected (for example, if the instructor selects D then the signal selected will be 109) and dividing these pulses in a counter so that a correct answer signal does not appear each time the corresponding signal 109 goes high but only once every fifth or tenth time, for example. In this way the correct answer may be distinguished from the student answer since it will flash rather than remain on at all times. This correct answer signal on line 187 is one input to AND-gate 185. The other AND input is from gate 133 previously discussed. When the output of gate 133 goes high after the switch S39 is closed, AND-gate 185 will be enabled and each time a correct answer pulse appears it will be gated to gate 171 and will turn on Q63. Since the correct answer pulse appears during the time a pulse is present on W109, L109 will light each time the correct answer pulse appears. Since the pulse is not present during each cycle, L109 will appear to flash.

For individual mode operation, Switch S46 will be closed causing one input of gate 135 to be at ground. When a selection is made the first flip flop in shift register 175 will be set, as explained above. An output from this flip flop, which is a ground when the flip flop is set, provides the other input to gate 135. When both inputs are at ground gate 135 will have a high output. This in turn will cause a high output on gate 133 which will inhibit gate 131 and enable gate 185, as previously noted. Hence, the correct answer signal on input 187 will be immediately gated to Q63 and the corresponding indicator lights L103, L105, L109, or L111 will flash. In this way the student will have simultaneous answer reinforcement since the time between his response and the correct answer being gated to his indicators is so short as to be unnoticeable to the human eye.

The way in which the invention simplifies the selection of groups of students to be displayed to the instructor can be seen by examining gates 181 and 191 and their associated logic. S49 represents the instructor's group selection switch 49 (FIG. 3) and in the position shown is enabling gate 181, allowing the response from the student responder logic shown to be gated through to the indicators. Gate 191 is the corresponding gate from another student responder's logic and has an input 193 which corresponds to the input from gate 183 in the logic shown. If we assume that the logic has been shown for student 1, and that, as shown on FIGS. 2 and 3 and explained above, the instructor may display the responses for 60 students at one time, then the output of gate 191 will represent the first student in the second group, i.e., student 61. Additional gates may be added for additional groups and will in turn represent student 121, 181 etc. Gate 191 drives transistor Q67A whose output is wired through line 198 to line 67. If switch S49 is placed in the position placing a voltage on line 195, the response of student 61 rather than student 1 will be gated through gate 191 and Q67a to line 67 and to the instructor's indicators. This results in the requirement of only one jumper wire 198 per student to tie additional student responder logic to the instructor's panel.

Line 199 is the output of the student responder card to the logic for computing and scoring. This logic may also make use of the time shared nature of the information and will be able, in a manner similar to that used in lighting the indicators, to tell from the signal on the one line 199, along with the signals 103 through 111 which are common throughout the system, which response has been selected and use that information in computing and scoring.

These operations and a preferred embodiment of implementation thereof will now be described, with descriptive headings provided for convenience in identifying the various functions.

RESPONSE SUMMARY

Figure 8:
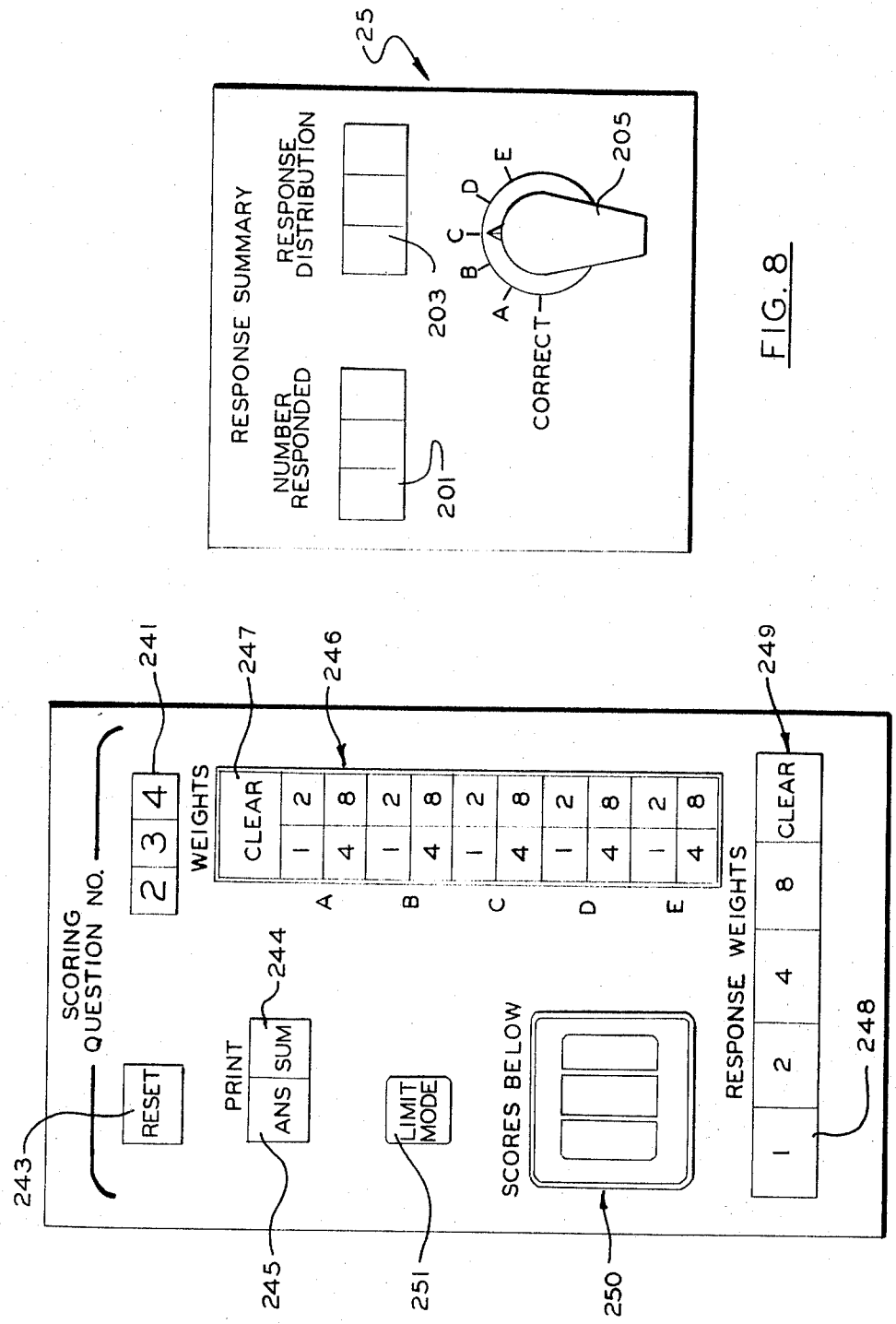
FIG. 8 illustrates an embodiment of the response summary panel of the indicator's console of FIG. 1.

FIG. 8 shows the response summary panel containing a display 201 of the total number of students responding, a display 203 of the percent responding with a selected answer, and a selector switch 205 to select the response to be displayed. At the beginning of each response period, display 201 will be reset and, as the students respond, it will periodically be updated to show how many have responded. This allows the instructor to determine when to go to the next question or instructional unit. This total is then used, in a manner to be described later, to generate the percent display 203. The instructor may select one of the letters A through E on switch 205 as the one for which a percent is to be displayed; alternatively, he may select the "correct" position on switch 205, in which case the percent will be computed using the number of students responding with the answer designated as the correct answer, and the total number of responses. The instructor may select a "correct" answer by pressing one of buttons 33 shown in FIG. 2 or the "correct" answer may be automatically designated as the one having the highest weight assigned, as will be described below. In this way display 203 provides an immediate indication of how the class is doing. If the correct percent is low the instructor may change selector 205 to one or more of the other positions and find which of the five possible responses were chosen by the higher percentages, and thus determine where the class is going wrong.

Figure 9:
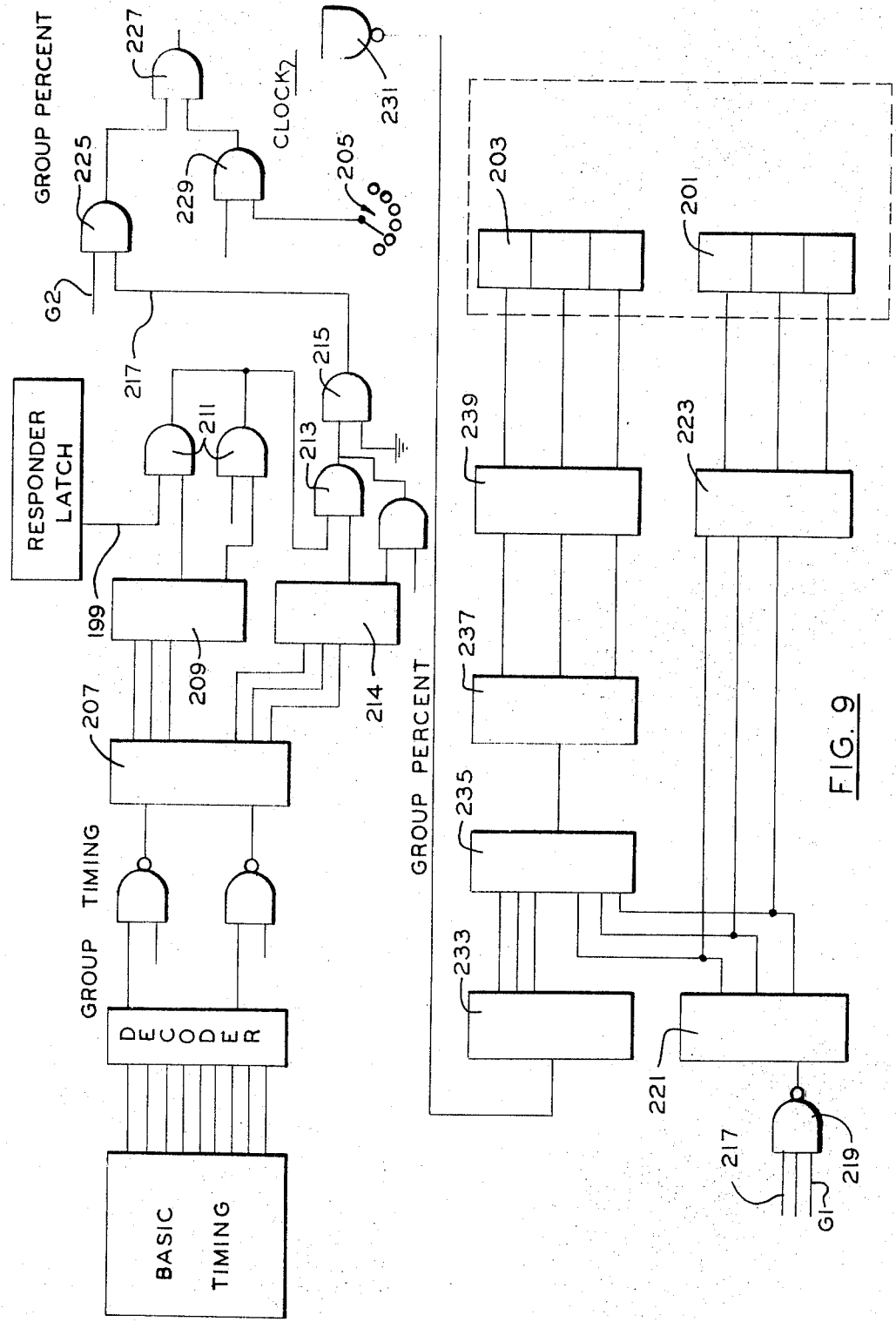
FIG. 9 is a logic diagram of an embodiment of the response summary computations.

The manner in which the total response and percent response are calculated can best be seen from FIG. 9. The calculation is done by time division of the arithmetic operations into two phases. During the first phase, called G1, the total response is calculated and during the second phase, called G2, the percent response is calculated. The G1 and G2 phase signals are supplied from the central clock and timing (not shown) and either one or the other is always on. Thus the displays of number responding and percent response are continually updated. During the G1 phase counter 207 will count from 0 to 60. Each count will be maintained for a time which allows all the phases, A thru E, represented by 103, 105, 107, 109, 111 on FIG. 7, to occur. This count is in binary form and is decoded in decoder 209 to give 60 decimal outputs, (the "0" count is not used) each output corresponding to one of 60 students. Each of these 60 outputs is connected to an AND-gate 211 which has as its other input the line 199 (also shown on FIG. 6) from its corresponding student responder latch. The decoded count results in a high being placed on one input of each of 60 gates 211 (two of which are shown in FIG. 9) in sequence, each gate corresponding to a student. If a student has made a response, then during a portion of the time the high from decoder 209 is on his corresponding gate, another high will be present on line 199, as previously explained, and an output from the gate will result. The output of the gates 211 for one group of 60 students are wire ORed together and then ANDed in a gate 213, of which there is one provided for each group of 60 students. The other input to gate 213 is from decoder 214 which decodes groups if more than one group of 60 students is being monitored. The signal is then passed through gate 215 (to invert the signal) which has an output 217, also an input of gate 219 shown at the bottom left of FIG. 9. At gate 219 it is ANDed with a G1 phase signal and if it occurs during the G1 phase it will be gated to counter 221. The result is that counter 221 will be incremented by 1 for each student response detected at gates 211, and, at the end of the G1 phase, the count will equal the number of students who have responded. The resulting binary count is continuously decoded in decoder 223 and the output used to drive counter 201, the display of total response.

During the G2 phase the process is repeated up to the point where the pulse comes out of gate 215. From that point, since this is now the G2 phase, it will not pass through gate 219 but will instead pass through gate 225 which has a signal on its other input during G2 phase. The output of gate 225 is one input to AND-gate 227. The other input results from the output of gate 229 which will be dependent on the selection made at selector 205. The positions of this switch 205 are connected to signals corresponding to 103, 105, 107, 109, and 111 on FIG. 7. The "correct" position of switch 205 will have on it the one of these 5 signals corresponding to the correct answer selected by the instructor with buttons 33 or by the automatic slection circuitry to be explained below. For example, if A is selected on switch 205, a signal corresponding to 103 will result on the output of gate 229. This results in only the pulses from gate 225 which occur during the time 103 is high being passed through gate 227. In the case of A then, as the decoder 209 sequences through the 60 students by placing highs on gates 211, only the signals of those students selecting A will get through to the output of gate 227.

As previously mentioned in the responder section, during each of phases A thru E on FIG. 7, 128 clock pulses occur. At gate 231, one hundred of these pulses are placed on one input to the gate during each of the phases A thru E. Since this is an AND gate, only when a high from gate 227 is present will these pulses pass through gate 231. And as previously mentioned, this occurs only when a student response corresponding to the selected response on switch 205 occurs.

The remainder of the logic can best be explained by a specific example. Assume a class of 12 students and a selection of A on switch 205. During the G1 phase, if all students answered, a count of 12 resulted in the counter 221 in the manner previously explained. During the G2 phase the system will again go through the 12 student responses to determine how many students selected A. If student 1 has not selected A then during his interrogation time no output will result at 231 since his pulse from gate 225 will never be in the proper time relation to the pulse from gate 229. Next, student 2's responder is interrogated and if he has selected A then 100 pulses will be output from gate 231 as explained above. These pulses will be counted in counter 233. The output of this counter goes to comparator 235 which has as its other input the total student count in counter 221. As soon as a comparison is made, that is, each time counter 233 gets to 12, (the number in counter 221) two things happen; counter 237 is incremented by 1, and counter 233 is reset. Since a total of 100 counts are received the counter will be reset 8 times, resulting in a count of 8 in counter 237 and a remaining count of 4 in counter 233 (100 12 = 8 + R4) If out of the remaining students only two more have selected A, then it can be seen that 200 more pulses will reach counter 233. The first one hundred will result in 8 more counts in counter 237 for a total of 16 and a remainder of 8 in counter 233. The next 100 will add 8 more counts to counter 237 but since there is an addition to the remainder in counter 233 of 4, making a total of 12, an additional comparison and additional count will result bringing the total in counter 237 to 25 counts. This is then decoded in decoder 239 and displayed on the percentage display 203. In this example we have interrogated 12 student responders, finding 3 responses which matched the selected response and have the proper percentage, i.e., 25 percent, displayed. As previously mentioned, this portion of the system operates continuously so that as the students respond a running total will be kept on the displays. The calculations shown for 12 students in the specific example above will operate to provide the correct percentage for any number of responses since what it is in effect doing is dividing 100 times the number of correct responses by the total number responding. This is mathmatically exactly the same as the normal percentage computation where the correct responses would be divided by total responses and then multiplied by one hundred. However, by using a novel arrangement of hardware it is possible to obtain the desired result without complicated circuitry.

SCORING

FIG. 10 shows the face of the scoring panel which performs functions in areas of assigning weights to each or any of the possible responses, selecting a minimum percentage and activating the indication of those students falling below that percentage level, and initiating print commands. When an instructor is about to start a lesson he will press reset switch 234, thus resetting the question number display 241 to "o." He may then assign a weight to any or all of the possible responses A thru E by pressing the proper switches 248 and 246. For example, if he wanted A to have weight of 10 he would first press switches 248 labeled 2 and 8, for a total of 2 plus 8 equal to 10. Then he would press switch 246(which has indicators below the numbers 1, 2, 4 and 8 to indicate the weight assigned(next to A and this value of 10 would be entered into the scoring circuits for A to be described later; lights behind the numbers 2, and 8 on the switch 246 next to A will light to provide the instructor with a continuing indication of the weight assigned to that choice. If he then wants to assign a weight of 14 to B, he would press clear switch 249, clearing the values in switches 248, and then press the switches 248 labeled 8, 4, and 2. Then, when the B switch is pressed, this value will be entered into the scoring circuits for B and lights behind 2, 4 and 8 on switch 246 next to B will be light. Similarly, he may assign weights to C, D, and E if desired. If he makes an error or wants to change weights on subsequent questions he may press clear switch 247 and all values associated with switches 246 and the scoring circuits will be reset to zero.

The next step is to press the responder enable 37 shown on FIG. 2 and, after the time for responding is up, press the lock and score switch 39 on the same panel. At this time display 241 will change from "o" to "1" indicating that question one has been scored. This cycle may then be repeated for as many questions as are to be asked. After the question has been scored the instructor may, if a printer is attached, request that the scoring information be printed out by pressing answer switch 245 in which case each student's answer for that question will be printed, and/or by pressing summary switch 244 in which case the cumulative scores of each student will be printed. The manner in which this scoring information is obtained and scored will be explained below but the printing operation is beyond the scope of this invention. The functions of switches 250 and 251 will be explained in another section of this specification.

Figure 11:
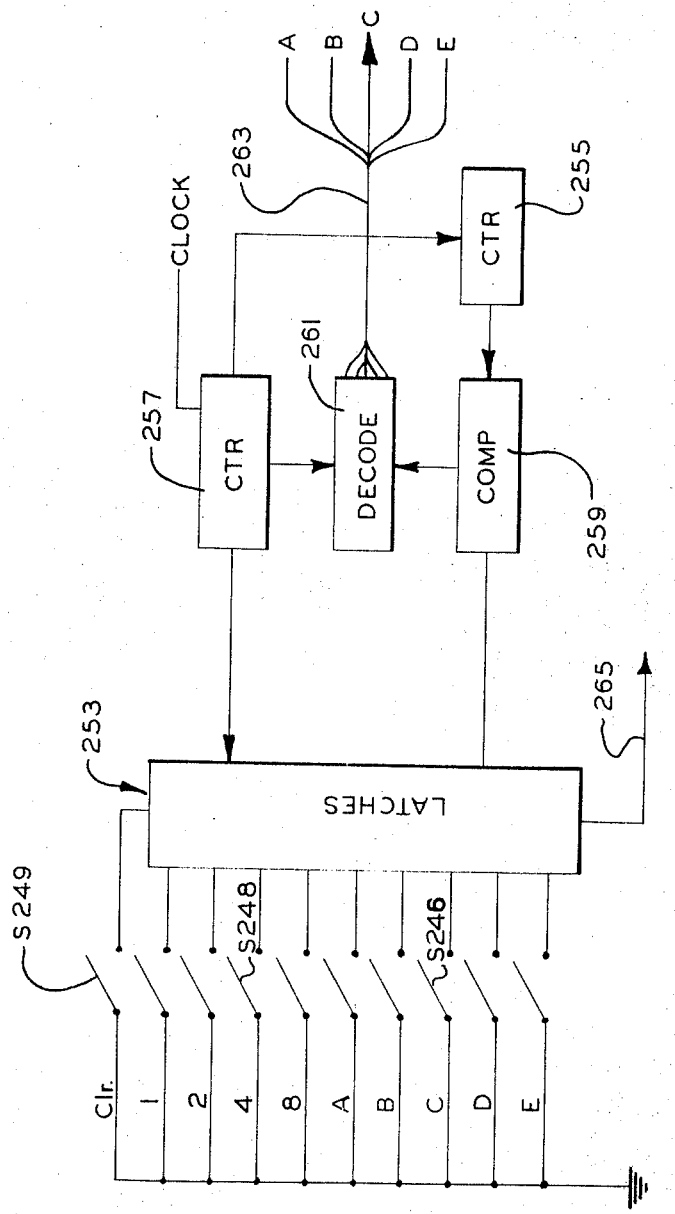
FIG. 11 is a block diagram of an embodiment of the circuits selecting the answer having the highest weight.

The way in which weights are entered and stored, and the highest weight selected as the "correct" answer is illustrated in FIG. 11. The latches indicated by block 253 consist of two stages. When a number switch 248 is pressed a corresponding latch in the first stage latches and continues to have an output after the instructor removes his finger from the switch. There is one first stage latch for each number, i.e., 1, 2, 4, and 8. The outputs of these four first stage latches are inputs to the second stage latches which comprise 5 groups of 4 latches each, each group corresponding to one of the letters A, B, C, D and E, and the latches in each group corresponding to 1, 2, 4, 8. When, after latching the desired first stage number latches, one of the letter switches 246 A, B, C, D, or E is pressed, the outputs from the first stage will cause the corresponding latches in the second stage associated with that letter to latch. In the example given above for a weight of 10, the first stage latches corresponding to 2 and 8 would have been set when switches 248 were pressed. Then, when the switch 246 corresponding to A was pressed, the corresponding two latches in A's second stage group would have been set. When the clear switch 249 was pressed only the first stage latches would be reset. Similarly, after setting in 14 for B, three of B's group of latches would be set, those corresponding to 2, 4, and 8.

To determine which answer, A, B, C, D or E has the highest weight, the steps described below take place. Counter 257, a 3-bit BCD counter which counts to 5 and then resets, is continually counting clock pulses and its outputs are used to sequentially gate the outputs of the second stage groups of latches to 4-bit comparator 259. For example, assume A had a weight of 10 and B a weight of 14. On the first count of counter 257, A's latches which have an output of 10 would be gated to comparator 259 and compared with the count in counter 255. Counter 255 counts down from 15 and when it reaches 0 it is reset back to 15 by appropriate gating (not shown). It will be assumed for this example that counter 255 has just been reset to 15. Since the operation described here runs continuously, it does not matter where the count begins, but a count of 15 is most logical. The count of 10 from A's latches would be found to be not equal to the 15 from counter 255. On count 2 of counter 257, B's output would be gated to the comparator and again inequality would be found. The same would be true for counts 3, 4, and 5 corresponding to C, D, and E. On the sixth count, counter 255 is decremented by one and now has a value of 14 in it. The comparison process is then repeated. Again A will not compare, but when the B values are gated in a comparison results. At this time an indication is given to decoder 261 which has been decoding the 3-bit BCD count in counter 257 into 5 outputs corresponding to A, B, C, D, and E. When it gets an indication from comparator 259 that equality has been found it will be on count 2, corresponding to B, and will provide an output on the line 263 labeled B and inhibit any further change in output until the counter 255 gets back to a count of 15. Then, if the instructor has changed the weight of one of the letters to 15, on the next pass through the sequence, it will be designated as the correct answer. If not, the indication of B as the answer having the highest weight will remain. The outputs on line 263 provide a signal to gating (not shown) which will gate the proper one of signals 103, 105, 107, 109 or 111 to the correct answer position of switch 205 on FIG. 9. In addition they light the answer select lamps 33 shown on FIG. 2 and also provide correct answer information to the response system, which end up on line 187 of FIG. 6 after being divided to provide flashing as previously explained. Another output 265 from latches 253 is used in student scoring as will be explained below.

Figure 12:
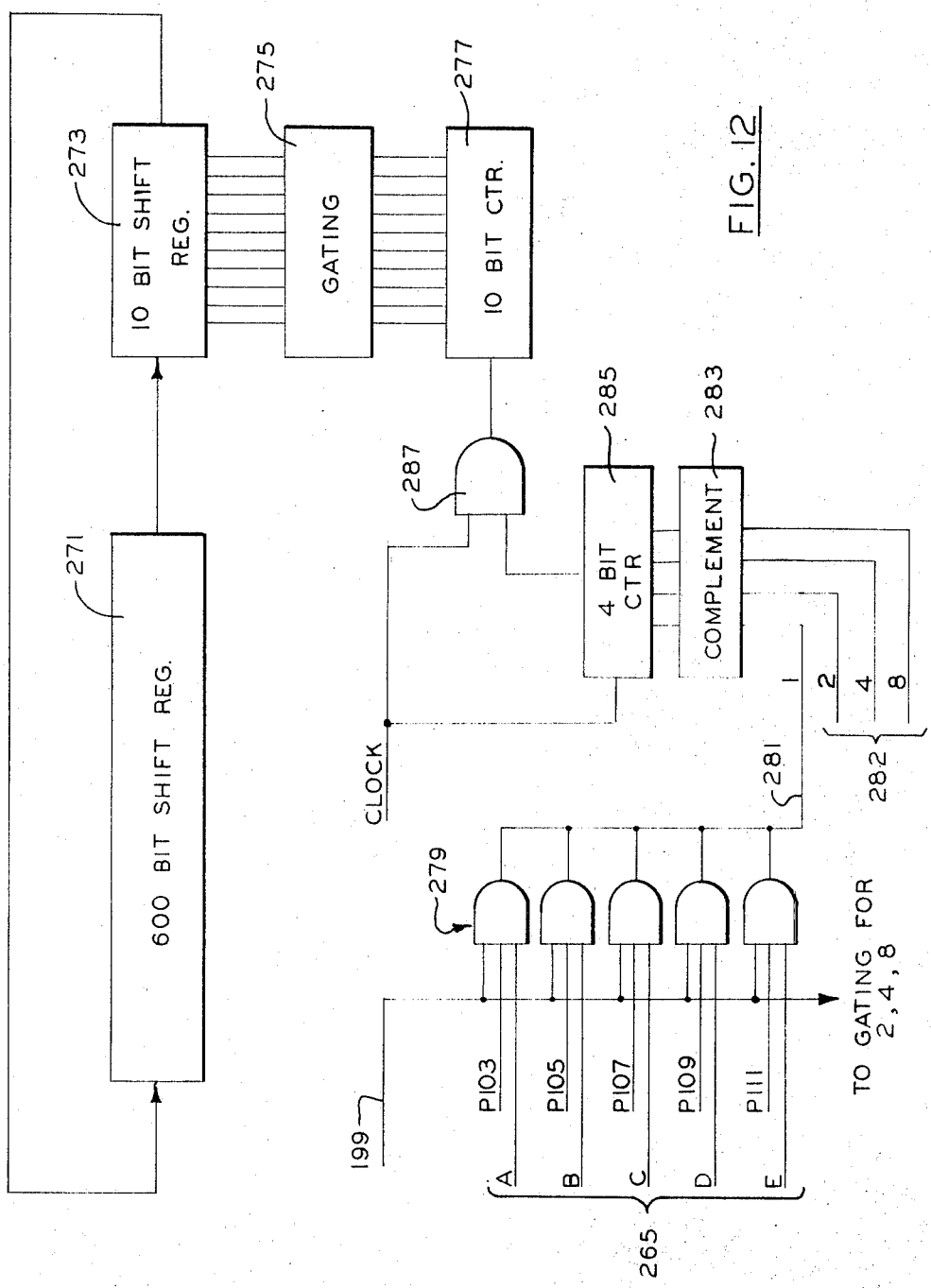
FIG. 12 is a logic block diagram of an embodiment of the student scoring circuit.

FIG. 12 illustrates how student scores are updated. Each student is assigned 10 BCD bits for his score, thus limiting the maximum score to 399. These 10 bits for each of 60 students are stored in a 600-bit serial shift register 271. After the lock and score switch 39 has been pressed, the scores are updated by timing and control circuits (not shown) which shift 10 bits at a time out of register 271 into a 10-bit shift register 273, then transfer these 10-bits by gating 275 to counter 277 where the student's score for the present answer is added to the old score, gate the 10 bits back to shift register 273 and shift in the next 10 bits. The process is repeated until all 60 scores are updated. The assigned weights and the student's response are used to determine the amount to add to his score. As previously explained, a pulse will appear on each student's responder output 199 (also shown in FIG. 6) during the phase corresponding to his answer. For example, if B were the answer it would appear during the phase represented by 105 on FIG. 7.

The output 199 of the student's responder is connected to four sets of AND-gates 279 of which one set is shown. The sets represent weights of 1, 2, 4 and 8, the gates for 1 being shown on FIG. 12. The second inputs to gates 279 are the outputs 265 from the latches shown on FIG. 11. As previously mentioned, the second stage latches comprise 5 groups of 4 latches each, the groups corresponding to the letters A, B, C, D and E and the latches in the group to weights of 1, 2, 4, and 8. The inputs 265 shown comprise the output of the latches corresponding to a weight of 1 from each of the 5 groups, i.e. A, B, C, D, and E. Similar inputs from the 2, 4, and 8 latches are input to the other three sets of gates 279 (not shown). The third inputs to the gates 279 are P103, P105, P107, P109, and P111, corresponding to the signals on FIG. 7. Thus, in the example above where the student had selected B, then during the phase represented by 105 two of the three inputs to one of gates 279 would be present. If in addition, B had a weight that included 1, when expressed in BCD form, i.e. 1, 3, 5, 7, 9, 11, 13, or 15, thus causing the corresponding latch to be latched and an output on the corresponding line 265, then an output would result on line 281. Similarly, if B had a weight containing 2, 4, or 8 outputs would result on one or more of lines 282 which are the outputs from the other sets of gates 279.

The output on 281 goes into a complement circuit 283. This circuit will have as an output the complement of the input. In our assumed case the 1 line 281 was high and all others, i.e., 2, 4, and 8, were zero. The resulting output from circuit 283 will be a high on the 8, 4 and 2 lines and a zero on the line. This complement is used to preset counter 285; the latter receives and counts clock pulses up to 15, at which time its output will inhibit gate 287. This counter will now be preset to 14 (8 + 4 + 2). As soon as it receives one count from the clock it will inhibit gate 287. The same count will have passed through gate 287 and added 1 to the student whose score was in counter 277. Similarly if the weight for answer C is 14 then, for a student selecting C, a value of 14 will reach complement circuit 283 during the C phase, and counter 285 will be preset to 1. It will then allow 14 counts to enter counter 277 before inhibiting gate 287 and hence the student's score will be increased by that amount. The timing and control which shifts the student's scores will also control the gating of clock pulses into gate 287 at the proper time. These timing and control circuits may be constructed from standard logic blocks using well-known digital techniques.

LOWER LIMIT

After scoring is complete the instructor may want to determine which of the students have cumulative scores falling below a certain minumum percentage. To get an indication of this he will first set a minimum percentage on switch 250 (FIG. 10) and press the limit mode switch 251. Circuitry to be described below will then make the necessary comparisons and the "E" indicator 35 on the instructor's panels 22 and 23 shown on FIGS. 2 and 3 will be lighted for each student whose score falls below the set percentage. This is done at a time between questions when no responses are being indicated on indicators 35.

Figure 13:
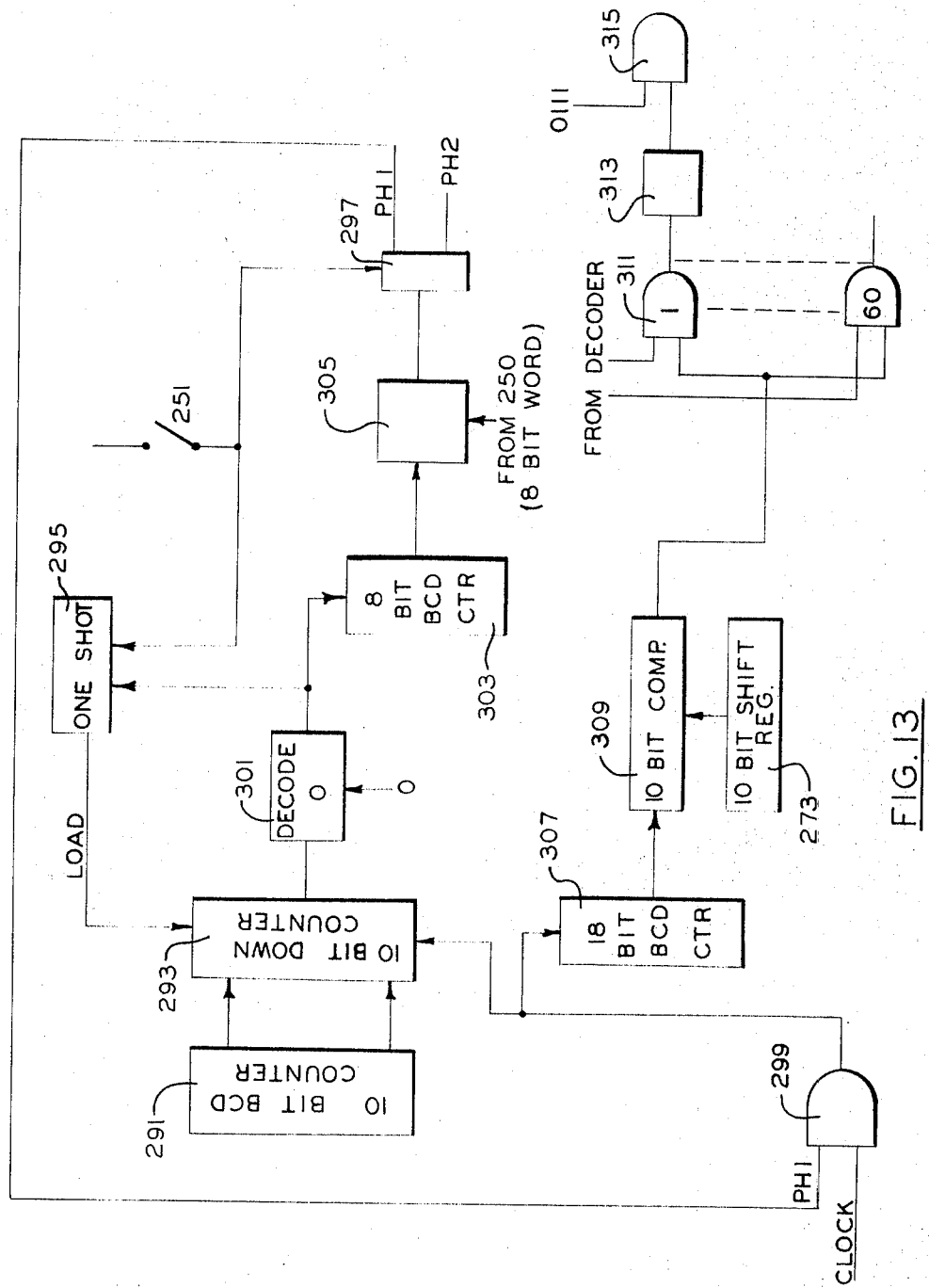
FIG. 13 is a logic block diagram of an embodiment of the circuitry used to determine scores below a selected percentage of total maximum score.

The circuits which accomplish the lower limit function are shown on FIG. 13. Each time a question is scored, the value of the answer having the highest weight from the circuitry on FIG. 11 is added to perfect score counter 291. Counter 291 then will have stored in it the maximum possible or perfect score. When switch 251 is pressed initiating the limit mode and triggering one-shot switching circuit 295 causing it to output a pulse, this value is then loaded in the 10-bit percentage set counter 293. The pressing of the switch 251 will also reset flop flop 297 and cause an output on the PH1 line. PH1, indicating phase one, is an input to AND-gate 299. The other input to gate 299 is the clock which provides a constant stream of pulses. With PH1 high (i.e., during phase one) the clock pulses will pass through gate 299 and begin counting down the perfect score in counter 293. When the count reaches zero the decoder 301 will have an output which will trigger one shot 295 causing the perfect score to be reloaded in counter 293. The same output of the decoder 201 will increment counter 303 by one. The output of this counter is compared with the percentage on switch 250 in comparator 305. When the value in counter 303 equals that set on switch 250 an output from comparator 305 will trigger flip flop 297 to the PH2 state and thus stop further pulses from passing through gate 299. The pulses from gate 299 are also counted in 18-bit counter 307.

An example should make the theory of operation clearer. Assume the instructor enters a percentage of 50 on switch 250 and then closes switch 251. Also assume a perfect score of 100. At the time switch 251 is pressed the value of 100 will be loaded into counter 293. Flip flop 297 will be reset and PH1 high. Clock pulses will now pass through gate 299 and count down the value in counter 293. These same pulses will be counted up in counter 307. After 100 pulses an output will occur from decoder 301. This will increment counter 303 by one and reload 100 into counter 293. This sequence will be repeated 50 times until the count in counter 303 equals 50, the quantity set on switch 250, and an output from comparator 305 triggers flip flop 297 to the PH2 state (indicating phase 2). The count in counter 307 will now be 50 times 100 or 5,000. The last two digits (8 BCD bits) of counter 307 are dropped giving a stored value of 50 (50 percent of 100 counts). This output from counter 307 provides one input to comparator 309. The other input is from shift register 273 also shown on FIG. 12. Now during phase 2, in a manner similar to the way in which it was done during scoring, each student's score is shifted into the shift register 273. If the student's score is less than the value output from counter 307 (in the example given, less than 50) an output results from comparator 309. This output may then be one input to a set of 60 gates 311, one gate corresponding to each of 60 students, which have as their other input the output of a decoder, similar to 209 on FIG. 9, which will indicate which student's score is being compared in comparator 309.

The output of gate 311 latches latch 313 which is then ANDed in gate 315 with a signal 0111 corresponding to 111 on FIG. 7, the E signal (since it is desired to light the E lamp for this indication). The output from gate 315 may then be used as a second input to OR-gate 183 on FIG. 6. The result is that, when a student has fallen below the set percentage, his latch 313 will latch causing gate 315 to output a signal corresponding to 111 on FIG. 7. When this is used as an input to gate 183 on FIG. 2 the result is the same as when the student selects E by pressing S111 as explained in the responder section, i.e., transistor Q67 will be turned on during the E phase represented by 111 and, since a corresponding signal is present on D111, indicator I111 will light. Since this mode is used only between response periods there can be no confusion as to the significance of the E light below a student's name. Also, since the input from gate 315 goes only to gate 183 the indication will be provided only to the instructor and not to the student. When the instructor goes to the next question by pressing enable switch 37 on FIG. 2 the latches 313 and the counters 293, 303, and 307 will be reset and further counting inhibited until the instructor again presses switch 251.

It can be seen then that by novel use of logic circuitry the disclosed invention provides to the instructor in a readily usable form, a response summary, and indication of students falling below a selected percentage. In addition, it allows assignment of weights to each of the possible student responses, which assignments are indicated to the instructor and easily changed, and automatically selects the highest score as the correct answer. And, it permits computation and storage of student scores which may then be printed for a hard copy record of student performance. All of this is done using a minimum of wiring and circuitry which is designed in a novel manner allowing each circuit to help in performing a number of the desired tasks.

Although a preferred embodiment in a particular teaching machine has been shown the methods and apparatus shown may be used in many types of teaching machines and in other applications where similar functions must be performed and it is not the intention of the inventor to limit his invention to the embodiment shown.

What is claimed is:

1. In testing apparatus comprising a plurality of student responders, each containing two or more switches operable one at a time, each switch corresponding to a particular one of two or more possible responses, said responders connected to a central instructor's station wherein a weight is assigned to each possible response and wherein student responses are stored, a method of keeping a cumulative record of each student's score as successive responses are made and scored comprising:
   a. assigning to each student an equal number of bits in a first serial shift register used as a memory in which to store said student scores; and
   b. repeating successively for a number of times equal to the number of students the following steps:
      1. shifting one of said students bits into a second shift register;
      2. gating said bits to a first counter;
      3. adding to said counter the student's score for the question being scored;
      4. gating said bits to said second shift register; and
      5. shifting said bits to said first shift register.

2. The method according to claim 1 wherein the student's score is added by steps comprising:
   a. loading the complement said score into a second counter, said counter capable of counting to a maximum score value which any answer may have;
   b. providing a train of pulses to said second counter and to said first counter; and
   c. disabling said pulse train when said second counter reaches its maximum value.

3. In a teaching machine comprising a plurality of student responders connected to a central control unit, each responder having two or more exclusively operable switches and having an output indicative of which of said switches has been depressed, each of said switches corresponding to one of two or more possible answers, each of said answers having been assigned a weight, said weight being stored in said control unit, apparatus to score and store cumulative scores for each of said responders comprising:
   a. a first serial shift register having a number of bits equal to the number of responders times the number of bits needed to store scores for one responder;
   b. a second serial shift register having a number of bits equal to the number of bits needed to store scores for one responder;
   c. a first counter having the same number of bits as said second shift register;
   d. bidirectional gating connecting said second shift register and said first counter;
   e. pulse generating means as an incrementing input to said first counter; and
   f. control means to sequentially:
      1. shift responder bits out of said first shift register to second shift register;
      2. gate said bits to said first counter;
      activate said pulse generating means for a time sufficient to allow a number of pulses equal to the responder score to enter said first counter, said score dependent upon said switch selection and assigned weight;
      4. gate said bits back to said shift register; and
      5. shift said bits back to said first shift register thus sequentially adding to each stored score the proper score for the question being scored.

4. The apparatus according to claim 3 wherein said pulse generating means comprises:
   a. score decoding means to compare said switch selection with said assigned weight and output the proper score for the responder being scored;
   b. complementing means having as an input said responder score from said decoding means and as an output the complement of said score;
   c. second counter means having as a presetting input the output of said complementing means and having an output when the value in said counter equals a predetermined maximum said maximum equal to the highest possible score on any one question;
   d. clock means providing a pulse train to said second counter; and
   e. gating means having as a first input said clock means and as a second input said second counter output and having an output to said first counter, said output present only when said second input is not present thus allowing a number of pulses equal to the proper score to be added to said first counter.

* * * * *